United States Patent
Farhoodi et al.

(10) Patent No.: US 12,041,488 B2
(45) Date of Patent: Jul. 16, 2024

(54) RADIO UNIT CASCADING IN RADIO ACCESS NETWORKS

(71) Applicant: Dell Products, L.P., Round Rock, TX (US)

(72) Inventors: Ahmad Farhoodi, Kanata (CA); Stephen E. Knobel, Kemptville (CA)

(73) Assignee: DELL PRODUCTS, L.P., Round Rock, TX (US)

( * ) Notice: Subject to any disclaimer, the term of this patent is extended or adjusted under 35 U.S.C. 154(b) by 213 days.

(21) Appl. No.: 17/647,093

(22) Filed: Jan. 5, 2022

(65) Prior Publication Data
US 2023/0217311 A1 Jul. 6, 2023

(51) Int. Cl.
*H04W 28/00* (2009.01)
*H04L 47/56* (2022.01)
*H04L 47/62* (2022.01)
*H04W 28/14* (2009.01)

(52) U.S. Cl.
CPC ............. *H04W 28/14* (2013.01); *H04L 47/56* (2013.01); *H04L 47/6225* (2013.01)

(58) Field of Classification Search
CPC ..... G06T 1/20; G06F 9/3867; G06F 15/7807; G06F 15/8053; H04L 47/6225; H04W 28/14

See application file for complete search history.

(56) References Cited

U.S. PATENT DOCUMENTS

| | | | |
|---|---|---|---|
| 7,301,367 B1 * | 11/2007 | Kavipurapu | H04L 47/623 326/38 |
| 9,961,585 B2 * | 5/2018 | Szilagyi | H04W 28/0289 |
| 10,423,567 B2 * | 9/2019 | Khan | G06F 13/4291 |
| 2003/0079230 A1 * | 4/2003 | Woodward, Jr. | H04N 21/2383 725/90 |
| 2003/0117945 A1 * | 6/2003 | Zboril | H04J 3/14 370/216 |
| 2013/0176988 A1 * | 7/2013 | Wang | H04L 5/0007 370/331 |

FOREIGN PATENT DOCUMENTS

WO WO-2011100492 A1 * 8/2011 ......... H04B 7/15592

* cited by examiner

*Primary Examiner* — Gerald A Smarth
(74) *Attorney, Agent, or Firm* — Amin, Turocy & Watson, LLP

(57) ABSTRACT

The described technology is generally directed towards radio unit cascading in radio access networks. Radio units (RUs) can be configured with processors adapted to support daisy chaining of multiple RUs, so that the multiple RUs can connect to one hardware interface at a distributed unit (DU). An RU processor for a given RU can be configured to receive downlink data, including downlink data for the given RU as well as downlink data for other downstream RUs. The RU processor can extract the downlink data for the given RU and forward the downlink data for other downstream RUs via a southbound interface. The RU processor can also be configured to receive uplink data from the other RUs, multiplex the received uplink data from the other RUs with uplink data from the given RU, and send the resulting multiplexed data towards the DU via a northbound interface.

19 Claims, 8 Drawing Sheets

RADIO UNIT CASCADING IN RADIO ACCESS NETWORKS

BACKGROUND

The architecture of radios access networks (RANs) used for fifth generation (5G) cellular communication networks includes radio units (RUs), distributed units (DUs), and centralized units (CUs). RUs are configured to handle digital front end communications with user equipment (UE), and the parts of the physical layer, as well as digital beamforming functions. DUs are configured to be placed upstream of RUs, and one DU can support multiple RUs. DUs can support functions such as radio link control (RLC), medium access control (MAC), and parts of the physical layer. CUs are configured to be placed upstream of DUs, and one CU can support multiple DUs. CUs can support functions such as radio resource control (RRC) and packet data convergence protocol (PDCP).

A DU can be coupled with RUs via fronthaul connections. From a hardware standpoint, the fronthaul connections can be implemented by cables and ports, such as Ethernet cables and Ethernet ports. For multiple fronthaul connections, a DU can be coupled to a switch such as an Ethernet switch. The switch is a separate piece of hardware comprising multiple ports. Each RU can be connected to a cable that connects a port on the switch. The switch can multiplex incoming RU communications and provide them to the DU for further processing.

The use of a hardware switch at the DU to couple the DU with multiple RUs is not always preferable. The switch and its multiple cables are additional pieces of equipment that requires installation, inspection and management. Some of the cables that connect to the switch may be long, e.g., in the case of RUs that are at long physical distances from the DU, leading to more difficult cable installations. There is a need for more flexible and adaptive solutions to connect multiple RUs to a DU.

The above-described background is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
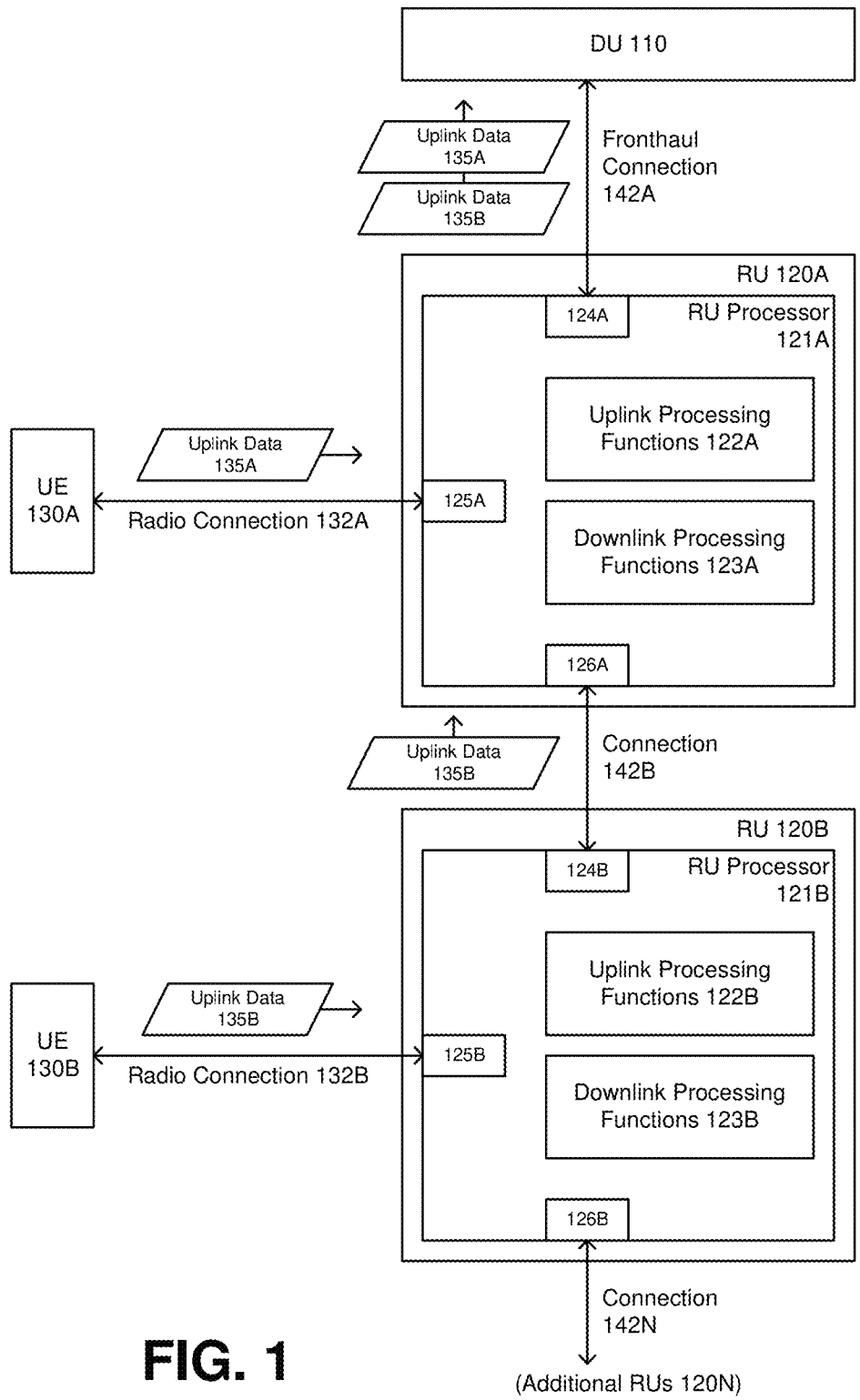
FIG. 1 illustrates an example system comprising a distributed unit (DU) coupled with multiple radio units (RUs), wherein the RUs can deliver uplink data to the DU, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards radio unit cascading in radio access networks. Radio units (RUs) can be configured with processors adapted to support daisy chaining of multiple RUs, so that the multiple RUs can connect to one hardware interface at a distributed unit (DU). An RU processor for a given RU can be configured to receive downlink data, including downlink data for the given RU as well as downlink data for other downstream RUs. The RU processor can extract the downlink data for the given RU and forward the downlink data for other downstream RUs via a southbound interface. The RU processor can also be configured to receive uplink data from the other RUs, multiplex the received uplink data from the other RUs with uplink data from the given RU, and send the resulting multiplexed data towards the DU via a northbound interface. Further aspects and embodiments of this disclosure are described in detail below.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 4G, 5G, or other next generation networks, the disclosed aspects are not limited to a 4G or 5G implementation, and/or other network next generation implementations, such as sixth generation (6G), as the techniques can also be applied, for example, in third generation (3G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), LTE frequency division duplex (FDD), time division duplex (TDD), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology. In this regard, all or substantially all aspects disclosed herein can be exploited in legacy telecommunication technologies.

FIG. 1 illustrates an example system comprising a distributed unit (DU) coupled with multiple radio units (RUs), wherein the RUs can deliver uplink data to the DU, in accordance with various aspects and embodiments of the subject disclosure. FIG. 1 includes a DU 110. The DU 110 is coupled via a fronthaul connection 142A to an RU 120A. RU 120A is coupled via a radio connection 132A to an example UE 130A. RU 120A is furthermore coupled via a connection 142B to an RU 120B. RU 120B is coupled via a radio connection 132B to an example UE 130B. RU 120B can be furthermore coupled via a connection 142N to any additional RUs 120N, wherein the additional RUs 120N can be coupled in a daisy chain that extends downstream of RU 120B, in optional further repetitions similar to the connection of RU 120B to RU 120A.

The RU 120A comprises an RU processor 121A. The RU processor 121A comprises uplink processing functions 122A, downlink processing functions 123A, a north interface 124A, a local radio interface 125A, and a south interface 126A. Similarly, the RU 120B comprises an RU processor 121B. The RU processor 121B comprises uplink processing functions 122B, downlink processing functions 123B, a north interface 124B, a local radio interface 125B, and a south interface 126B. Any additional RUs 120N can be configured similarly to the RUs 120A and 120B. In some embodiments, a last RU of the additional RUs 120N need not necessarily be configured similarly to the RUs 120A and 120B. Instead, the last RU can optionally be configured as a standard RU that need not include features described herein.

In example operations according to FIG. 1, RU 120B can receive uplink data 135B via its radio connection 132B to UE 130B. RU 120B can also have multiple additional radio connections to additional UEs, as can be appreciated, and the uplink data 135B can optionally comprise uplink data from such multiple UEs. The RU processor 121B can receive the uplink data 135B via local radio interface 125B. The RU processor 121B can employ uplink processing functions 122B to send the uplink data 135B via the north interface 124B and connection 142B.

RU 120A can receive uplink data 135B via connection 142B and south interface 126A. The RU processor 121A can employ uplink processing functions 122A to send the uplink data 135B via the north interface 124A and connection 142A. Furthermore, RU 120A can receive uplink data 135A via its radio connection 132A to UE 130A. RU 120A can also have multiple additional radio connections to additional UEs, as can be appreciated, and the uplink data 135A can optionally comprise uplink data from such multiple UEs. The RU processor 121A can receive the uplink data 135A via local radio interface 125A. The RU processor 121A can employ uplink processing functions 122A to send the uplink data 135A via the north interface 124A and fronthaul connection 142A. Uplink processing functions 122A, 122B can include, inter alia, multiplexers that are configured to multiplex uplink data received via south interfaces 126A, 126B with uplink data received via local radio interfaces 125A, 125B. The DU 110 can therefore receive a multiplexed data stream comprising uplink data 135A, uplink data 135B, and optionally additional uplink data from the additional RUs 120N.

Figure 2:
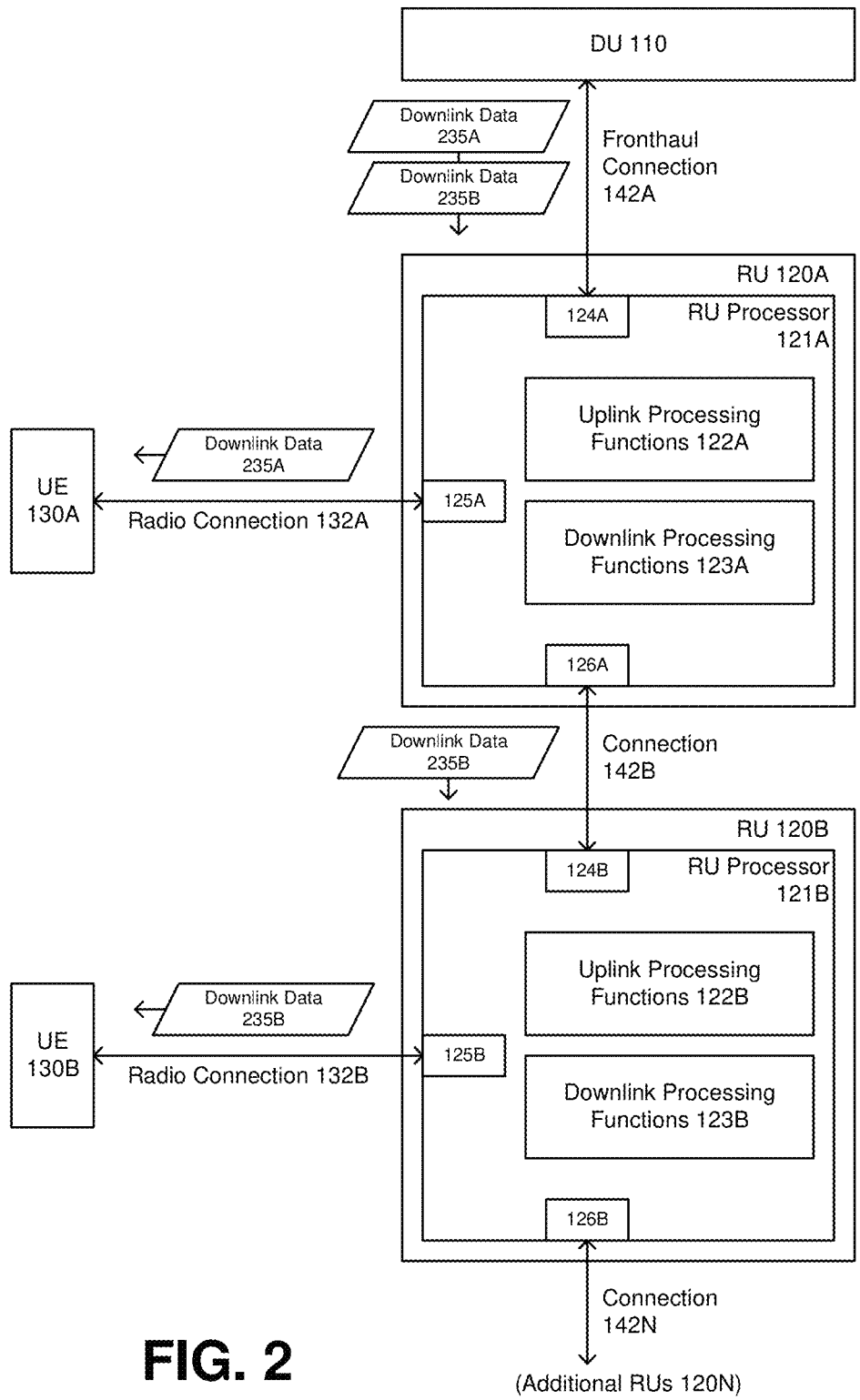
FIG. 2 illustrates delivery of downlink data to the RUs in a system according to FIG. 1, in accordance with various aspects and embodiments of the subject disclosure.

FIG. 2 illustrates delivery of downlink data to the RUs in a system according to FIG. 1, in accordance with various aspects and embodiments of the subject disclosure. FIG. 2 includes the DU 110, RU 120A, UE 130A, RU 120B, UE 130B, and additional RUs 120N introduced in FIG. 1, and like elements are given like identifiers.

In example operations according to FIG. 2, the DU 110 can be configured to send a multiplexed data stream comprising downlink data 235A, downlink data 235B, and optionally additional downlink data for the additional RUs 120N via fronthaul connection 142A.

RU 120A can receive the data stream comprising downlink data 235A and downlink data 235B via fronthaul connection 142A and north interface 124A. The RU processor 121A can employ downlink processing functions 123A to extract downlink data 235A from the received data stream, and to send downlink data 235A via its local radio interface 125A and radio connection 132A to UEs served by the RU 120A, such as UE 130A. The downlink processing functions 123A can also copy and forward the downlink data 235B, along with any additional downlink data for additional RUs 120N, via south interface 126A and connection 142B.

RU 120B can receive the data stream comprising downlink data 235B, and optionally additional downlink data for the additional RUs 120N, via connection 142B and its north interface 124B. The RU processor 121B can employ downlink processing functions 123B to extract downlink data 235B from the received data stream, and to send downlink data 235B via its local radio interface 125B and radio connection 132B to UEs served by the RU 120B, such as UE 130B. The downlink processing functions 123B can also copy and forward any additional downlink data for additional RUs 120N, via south interface 126B and connection 142N.

Figure 3:
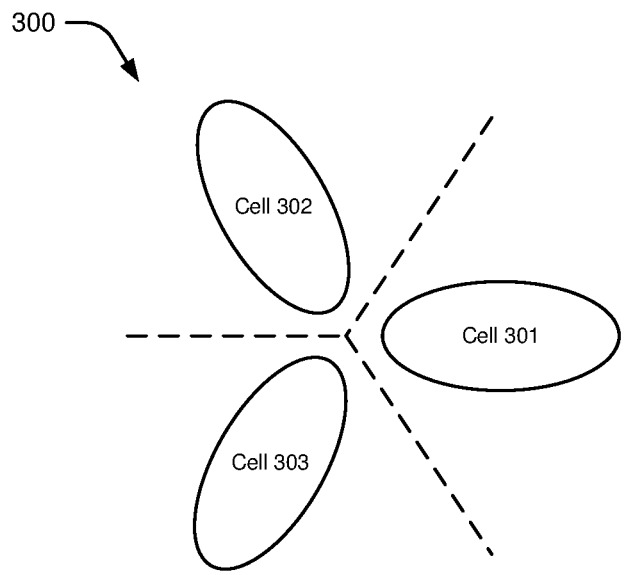
FIG. 3 illustrates an example radio site comprising three example cells, in accordance with various aspects and embodiments of the subject disclosure.

FIG. 3 illustrates an example radio site comprising three example cells, in accordance with various aspects and embodiments of the subject disclosure. The example radio site 300 comprises example cells 301, 302, and 303. Each of the cells 301, 302, and 303 can be supported by a different RU, as shown in FIG. 4.

Figure 4:
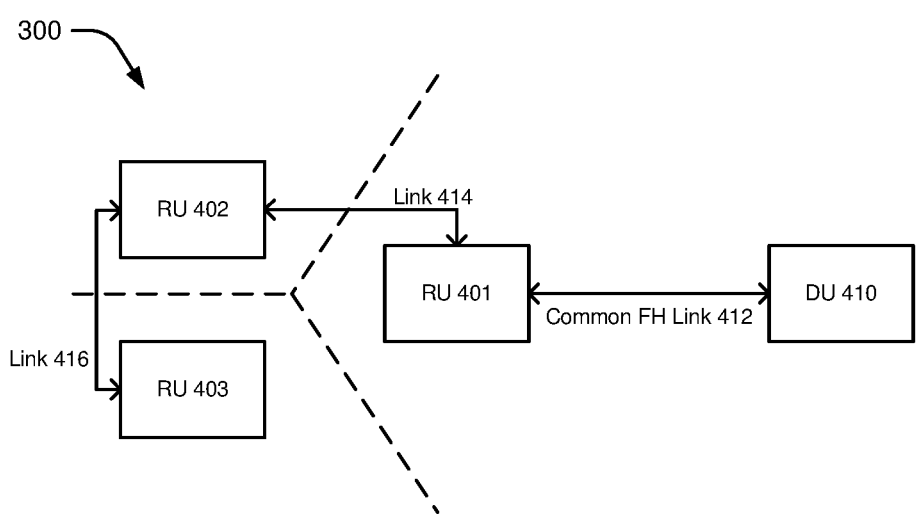
FIG. 4 illustrates example RUs in the radio site introduced in FIG. 3, wherein the RUs are linked in a daisy chain which is linked to a DU, in accordance with various aspects and embodiments of the subject disclosure.

FIG. 4 illustrates example RUs that can be included in the radio site introduced in FIG. 3, wherein the RUs are linked in a daisy chain which is linked to a DU, in accordance with various aspects and embodiments of the subject disclosure. FIG. 4 includes the radio site 300, RU 401, RU 402, RU 403, and DU 410. RU 401 can support the first cell 301 illustrated in FIG. 3, RU 402 can support the second cell 302 illustrated in FIG. 3, and RU 403 can support the third cell 303 illustrated in FIG. 3. The RU 401 is coupled via a common fronthaul (FH) link 412 to the example DU 410. The RU 401 is coupled via a link 414 to the RU 402, and the RU 402 is coupled via a link 416 to the RU 403. Some embodiments described herein can include three RUs, as shown in FIG. 4. However, techniques according to this disclosure can optionally be extended to support additional or fewer RUs.

In the illustrated arrangement, a north/south coordinate system can be used to refer to the RUs 401, 402, 403 and the DU 410, wherein the DU 410 can be referred to as the northernmost node, and the RU 403 can be the southernmost node. Thus any of the RUs 401, 402, 403 and the DU 410 can be referred to as "north" or "south" of another node. For example, RU 402 is north of RU 403, and RU 402 is south of RU 401. Stated another way, RU 403 is the south node of RU 402, and RU 401 is the north node of RU 402. The various other nodes can also be referred to as north nodes or south nodes with reference to their neighbor nodes.

In some embodiments, the RUs 401, 402, 403 and the DU 410 can be implemented according to open radio access network (ORAN) design specifications and can furthermore include features according to this disclosure. Embodiments of this disclosure can therefore include cascaded RUs in an ORAN network. Each RU can optionally cover an independent and separate cell in a multiple-cell scenario, as shown in FIG. 3 and FIG. 4.

In this disclosure, "radio cascading" or "daisy chaining" refers to scenarios in which multiple RUs 401, 402, 403 are connected to each other in a chain fashion and connected to the DU 410 via a common FH link 412, as illustrated in FIG. 4. The RUs 401, 402, 403 in the cascaded chain can support a "copy function." RUs which support the copy function can be referred to as "cascade RUs". Note that the southernmost RU 403 can optionally support the copy function, however, the southernmost RU 403 need not use the copy function. Therefore, the southernmost RU 403 can optionally comprise a "normal" RU (without the copy function) or a cascade RU.

Figure 5:
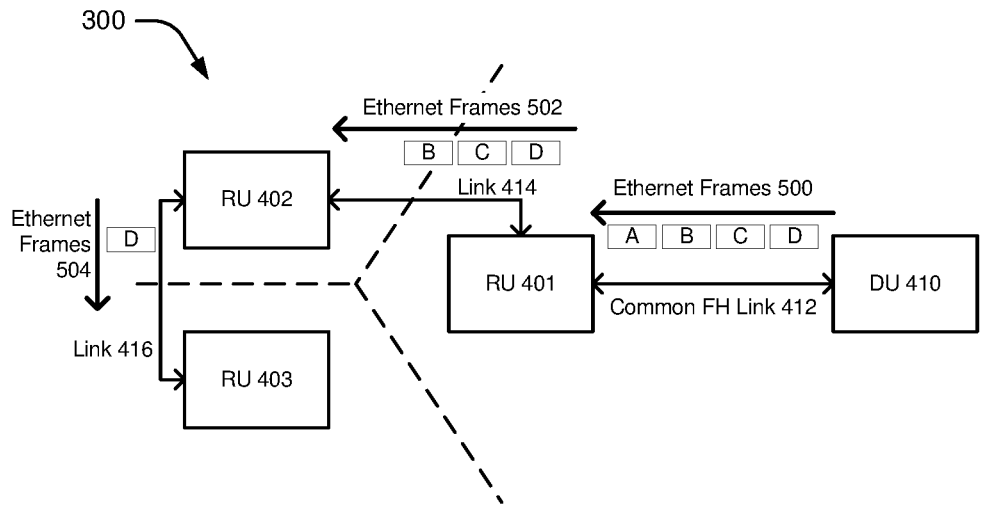
FIG. 5 illustrates example delivery of downlink data to the RUs introduced in FIG. 4, in accordance with various aspects and embodiments of the subject disclosure.

FIG. 5 illustrates example delivery of downlink data to the RUs introduced in FIG. 4, in accordance with various aspects and embodiments of the subject disclosure. FIG. 5 includes the radio site 300 including the RU 401, RU 402, RU 403, and the DU 410, introduced in FIG. 4. Downlink data sent from DU 410 to RU 401 via common FH link 412 can include Ethernet frames 500, e.g. example Ethernet frames A, B, C, and D. Downlink data sent from RU 401 to RU 402 via link 414 can include Ethernet frames 502, e.g. example Ethernet frames B, C, and D. Downlink data sent from RU 402 to RU 403 via link 416 can include Ethernet frames 504, e.g. example Ethernet frame D.

In the downlink direction, each cascade RU, e.g., RU 401, can be configured to copy Ethernet frames coming from its north node. For example, DU 410 is the north node of RU 401. Ethernet frames can be copied in their entirety, including header and payload, optionally without modification. The cascade RU, e.g., RU 401, can then send copied Ethernet frames towards its south node. For example, RU 402 is the south node of RU 401. Such a copy and send operation can be performed by all the RUs in a cascaded chain, except for the southernmost RU 403, which can operate in a normal/non-cascade mode.

Figure 6:
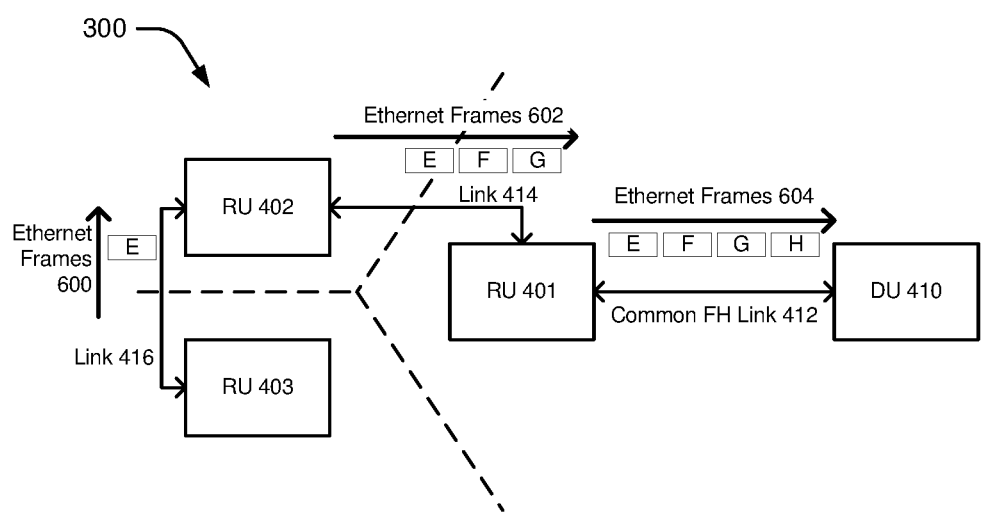
FIG. 6 illustrates example delivery of uplink data from the RUs to the DU introduced in FIG. 4, in accordance with various aspects and embodiments of the subject disclosure.

FIG. 6 illustrates example delivery of uplink data from the RUs to the DU introduced in FIG. 4, in accordance with various aspects and embodiments of the subject disclosure. FIG. 6 includes the radio site 300 including the RU 401, RU 402, RU 403, and the DU 410, introduced in FIG. 4. Uplink data sent from RU 403 to RU 402 via link 416 can include Ethernet frames 600, e.g. example Ethernet frame E. Uplink data sent from RU 402 to RU 401 via link 414 can include Ethernet frames 602, e.g. example Ethernet frames E, F, and G. Uplink data sent from RU 401 to DU 410 via common FH link 412 can include Ethernet frames 604, e.g., example Ethernet frames E, F, G, and H.

In the uplink direction, each cascade RU in the chain, e.g., RU 401, can be configured to copy uplink data received from its south node, e.g., RU 402, and forward the uplink data to its north node, e.g., DU 410. As with downlink data, uplink data Ethernet frames can be copied in their entirety. The southernmost RU 403 does not receive any uplink data (from other RUs) and so can operate in normal/non-cascade mode. Furthermore, each cascade RU, e.g., RU 401, can also send its own uplink traffic to its north node, for example by RU 401 sending Ethernet frame H, received over the air from a UE, to DU 410.

Figure 7:
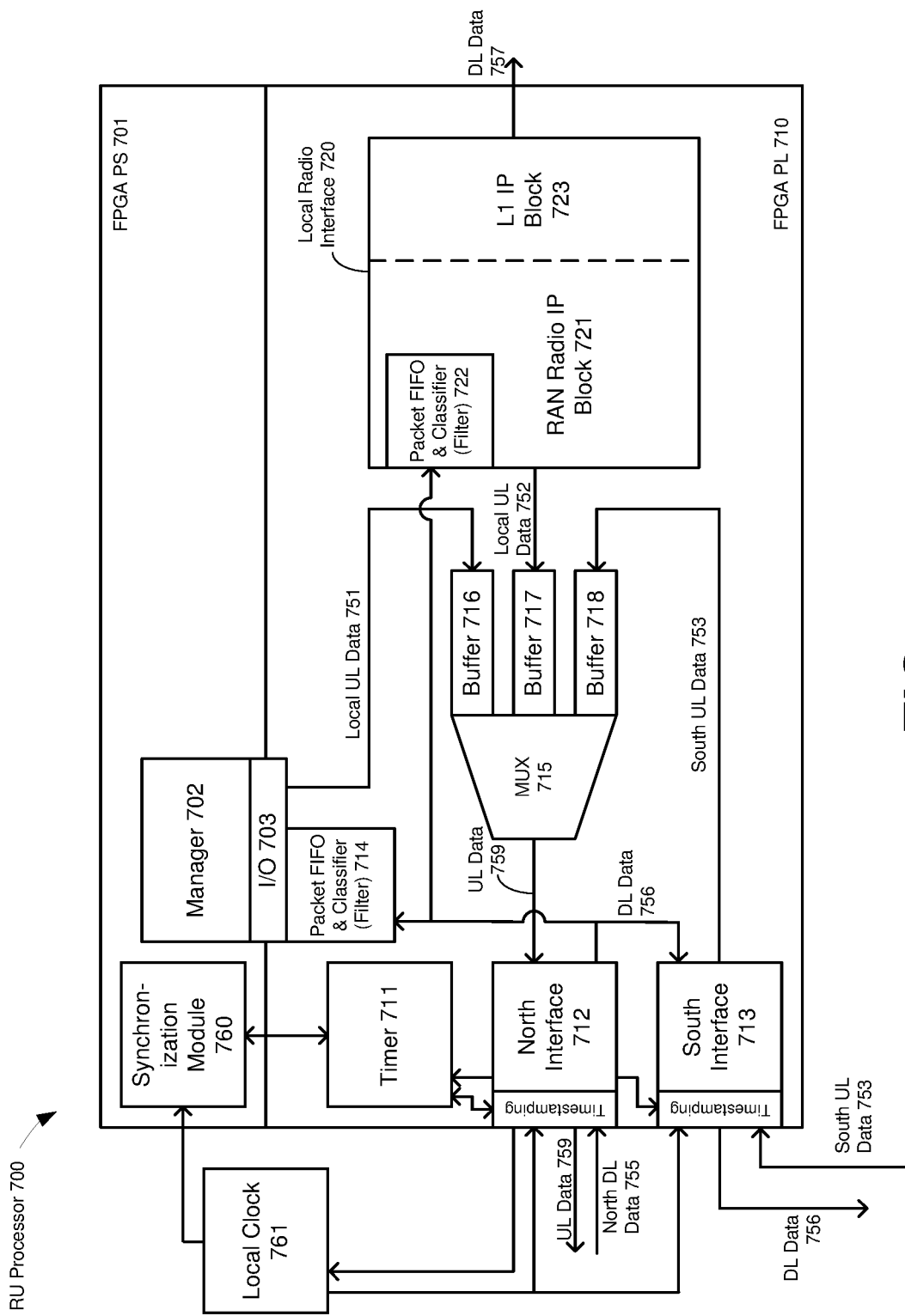
FIG. 7 illustrates an example RU processor architecture, in accordance with various aspects and embodiments of the subject disclosure.

FIG. 7 illustrates an example RU processor architecture, in accordance with various aspects and embodiments of the subject disclosure. An example RU processor 700 can be implemented via a field programmable gate array (FPGA). The FPGA can include a processing system portion (FPGA PS) 701 and a programmable logic portion (FPGA PL) 702. Different elements of the RU processor 700 can be implemented in the FPGA PS 701 or in the FPGA PL 702, or in both the FPGA PS 701 and the FPGA PL 702, as shown.

The RU processor 700 includes a north interface 712, a south interface 713, a local radio interface 720, and a multiplexer (MUX) 715 with buffers 716, 717, 718. The north interface 712 and the south interface 713 can each include timestamping which can be synchronized using a timer 711, a local clock 761, and a synchronization module 760. The local radio interface 720 can include a RAN radio IP block 721 and a L1 IP block 723. The RAN radio IP block 721 can include a packet first in first out (FIFO) and classifier 722. Additionally, the RU processor 700 can include a manager 702, an input/output (I/O) 703, and another packet FIFO and classifier 714.

Operations to process uplink data using the RU processor 700 can include receiving south UL data 753 via the south interface 713 and copying the south UL data 753 into the buffer 718. Local UL data 752 can be received via the local radio interface 720 and copied into the buffer 717. Additional local UL data 751 can be generated, e.g., by the manager 702, and can be copied into buffer 716. The MUX 715 can be configured to multiplex the data from buffers 716, 717, 718, thereby generating UL data 759. The UL data 759 can be sent via north interface 712.

In some embodiments, the MUX 715 can comprise a statistical multiplexer placed in the north uplink data path, to support uplink traffic. The buffers 716, 717, 718 can comprise packet buffers and can be used to store uplink traffic from multiple sources, such as south UL data 753 traffic from a south node, local UL data 752 such as C/U plane traffic from the local radio interface 720, and local UL data 751 such as local S/M plane traffic and OA&M traffic.

The statistical MUX 715 can be configured to support, e.g., a classical weighted round robin (CWRR) or an interleaved weighted round robin (IWRR) scheduling algorithm. The scheduling algorithm can be chosen to minimize latency for all cascaded RUs in an uplink data path. In an embodiment with three cascaded RUS, the scheduling algorithm can reserve around 75% of north uplink bandwidth for UL traffic from south nodes (using buffer 718) and the scheduling algorithm can reserve 25% of north UL bandwidth to be shared between local C/U-plane and local M/S-Plane/OA&M traffic (using buffers 717 and 716). In embodiments comprising more or fewer cascaded RUs, the scheduling algorithm can be adapted accordingly to use more or fewer resources for buffer 718.

Cut-through can be used to minimize the storage requirement and latency of each UL data path. However, buffers 716, 717, 718 can nonetheless be used to store traffic while data from other buffers is being sent via north interface 712.

The respective packet buffers 716, 717, 718 can be sized for their respective traffic storage needs, wherein traffic storage needs for a buffer, e.g., buffer 716, can be based on a timeframe that is long enough to send out at least two maximum sized frames from the other buffers 717, 718, plus at least one packet from the buffer 716. If jumbo frames are to be used, packet buffers 716, 717, 718 should be at least 3 jumbo frames in depth. The intent can be to keep the buffers 716, 717, 718 as empty as possible, while providing sufficient storage capacity for when a UL data path is blocked by another transmit source.

Operations to process downlink data using the RU processor 700 can include receiving north DL data 755 via the north interface 712. The north DL data 755 can be filtered by the packet FIFO and classifier 714 in order to extract management and synchronization plane data for the manager 702, and the DL data 756 can be sent via the south interface 713. The north DL data 755 can also be filtered by the packet FIFO and classifier 722 at the local radio interface 720 in order to extract DL data 757 to be sent to UEs, and the DL data 757 can be sent via the local radio interface 720.

In some embodiments, unmodified north DL data 755 traffic can be copied from the north interface 712 to all targets including the south interface 713, for transmission to south nodes. The north interface 712 and the south interface 713 can each comprise, e.g., a MAC/PHY type interface. In the downlink data path, hardware accelerated packet classifiers such as the packet FIFO and classifier 714 and the packet FIFO and classifier 722 can be used in front of local targets, e.g., the local radio interface 720, to minimize processing requirements in the local radio interface 720. Packet classifiers such as the packet FIFO and classifier 714 and the packet FIFO and classifier 722 can filter all traffic not associated with a local target, e.g., UEs not connected to the local radio interface 720.

Downlink S-Plane, M-Plane and OA&M traffic for the local radio interface 720 can be passed to the manager 702 and software stacks for processing. All other traffic can be filtered out by a hardware accelerated packet classifier such as the packet FIFO and classifier 714. Uplink S-Plane, M-Plane and OA&M traffic from the manager 702 can be passed, as local UL data 751, to the north interface 712 via buffer 716.

With regard to timestamping and synchronization functions, in some embodiments, in order to pass IEEE1588 timing to south nodes, each RU processor 700 can implement an IEEE1588 transparent clock, such as timer 711. The transparent clock function can adjust north and south bound precision timing protocol (PTP) timestamps for local residency delays within the RU processor 700. For local timing, each RU processor 700 can implement slave clock behavior, and a local clock 761 can be used for this purpose.

In addition to IEEE1588 timestamp management, each RU processor 700 can support synchronous Ethernet. Clock recovery from north nodes (i.e., from a north attached DU or a north attached RU) can be conducted. Both north and south interfaces 712, 713 can use the reference clock from local clock 761. This reference clock can be derived from synchronization timing, traceable back to the north node.

In some embodiments according to FIG. 7, a processor 700 for a radio unit of a radio access network can comprise a first buffer 717 adapted to receive first uplink data 752 from a local radio interface 720, wherein the local radio interface 720 is adapted to receive the first uplink data 752 from a user equipment that is wirelessly coupled to the radio unit. The processor 700 can further comprise a second buffer 718 adapted to receive second uplink data 753 from a south interface 713, wherein the south interface 713 is adapted to receive the second uplink data 753 from a downstream radio unit. The processor 700 can further optionally comprise a third buffer 716 adapted to receive third uplink data 751, wherein the third uplink data 751 can comprise, e.g., local synchronization plane data, local management plane data, and/or local operations, administration and maintenance (OA&M) data.

The processor 700 can further comprise a multiplexer 715 adapted to select a buffer repetitively from among the first buffer 717, the second buffer 718, and optionally the third buffer 716 and send uplink data 759 from the selected buffer via a north interface 712, wherein the north interface 712 is adapted to send the uplink data 712 to an upstream device in the radio access network. The upstream device in the radio access network can comprise, e.g., an upstream distributed unit (DU) or an upstream radio unit (RU).

The multiplexer 715 can be adapted to perform round-robin selection of the selected buffer. The round-robin selection of the selected buffer can comprise a weighted round-robin selection adapted to select the second buffer 718 more frequently than the first buffer 717 and/or the third buffer 716. The weighted round-robin selection can comprise, e.g., an interleaved weighted round-robin selection. The north interface 712 can be adapted to apply a timestamp to the uplink data 759, and the timestamp can be adjusted to account for delay that the uplink data 759 experiences as it passes through a radio unit comprising the RU processor 700.

The first uplink data 752, the second uplink data 753 and the third uplink data 751 can comprise data packets, and the multiplexer 715 can be adapted to use a cut-through approach to send the uplink data from the selected buffer. The cut-through approach can enable the multiplexer 715 to send a portion of a data packet from the selected buffer.

Furthermore, the north interface 712 can be further adapted to receive downlink data 755, and the south interface 713 can be further adapted to send the downlink data 755, and the processor 700 can be further adapted to forward the downlink data 755 from the north interface 712 to the south interface 713. The downlink data 756 can be identical to the downlink data 755 or can comprise a subset of the downlink data 755. The processor 700 can comprise a packet classifier 722 to extract local downlink data 757 from the downlink data 755, and the local radio interface 720 can be adapted to send the local downlink data 757 to the user equipment.

In another example embodiment according to FIG. 7, a radio unit for a radio access network can comprise an RU processor 700 that includes a group of buffers comprising a first buffer 717, a second buffer 718, and optionally a third buffer 716. A local radio interface 720 can be coupled with the first buffer 717. The radio unit can be configured to receive, via the local radio interface 720, first uplink data 752 from a user equipment that is wirelessly coupled with the radio unit. The radio unit can be configured to store the first uplink data 752 in the first buffer 717.

The radio unit can further comprise a south interface 713 coupled with the second buffer 718, wherein the radio unit can be configured to receive, via the south interface 713, second uplink data 753 from a downstream radio unit, and wherein the radio unit can be configured to store the second uplink data 753 in the second buffer 718.

The radio unit can further comprise a multiplexer 715 coupled with the group of buffers 717, 718, 716, wherein the multiplexer 715 can be configured to multiplex the first uplink data 752 in the first buffer 717, the second uplink data 753 in the second buffer 718, and optionally the third uplink data 751 in the third buffer 716, resulting in a multiplexed output 759. The multiplexer 715 can be configured to use round-robin selection of the first buffer 717, the second buffer 718, and optionally the third buffer 716 to multiplex the first uplink data 752 in the first buffer 717, the second uplink data 753 in the second buffer 718 and optionally the third uplink data 751 in the third buffer 716. The radio unit can further comprise a north interface 712 coupled with the multiplexer 715, wherein the radio unit can be configured to send, via the north interface 712, the multiplexed output 759 to an upstream device in the radio access network.

The radio unit can further comprise a clock in the form of timer 711, and the radio unit can be configured to use the clock 711 to apply timestamps to the multiplexed output 759. The radio unit can be further configured to receive downlink data 755 via the north interface 712 and forward the downlink data 755, or a subset thereof, via the south interface 713.

Figure 8:
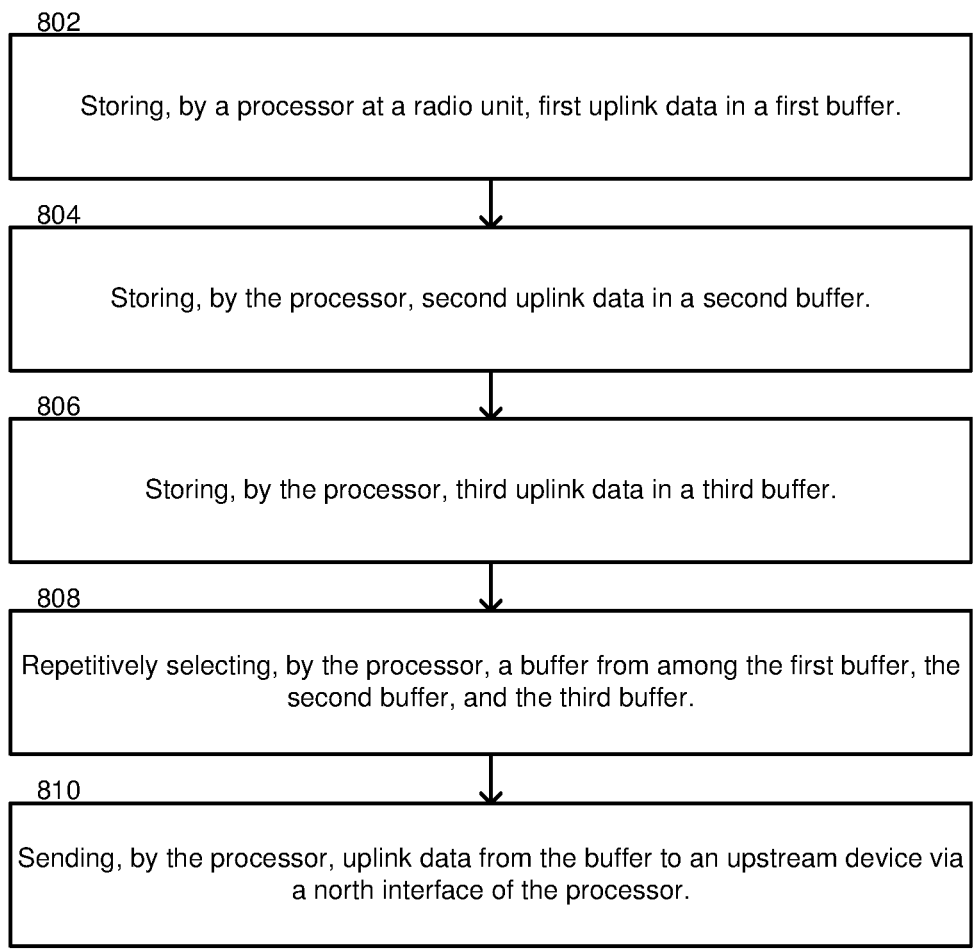
FIG. 8 is a flow diagram representing example operations of an RU processor in connection with processing uplink data, in accordance with various aspects and embodiments of the subject disclosure.

FIG. 8 is a flow diagram representing example operations of an RU processor in connection with processing uplink data, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 8 can be performed, for example, by an RU processor 700 such as illustrated in FIG. 7. Example operation 802 comprises storing, by a processor 700 at a radio unit, first uplink data 752 in a first buffer 717. The first uplink data 752 is received from a user equipment that is wirelessly coupled with the radio unit via a local radio interface 720 of the processor 700. Example operation 804 comprises storing, by the processor 700, second uplink data 753 in a second buffer 718, wherein the second uplink data 753 is received from a downstream radio unit via a south interface 713 of the processor 700. Example operation 806 comprises storing, by the processor 700, third uplink data 751 in a third buffer 716, wherein third uplink data 751 comprises local synchronization plane data, local management plane data, and/or local OA&M data.

Example operation 808 comprises repetitively selecting, by the processor 700, a buffer from among the first buffer 717, the second buffer 718, and/or the third buffer 716. Repetitively selecting the buffer can comprise, e.g., round-robin selection of the buffer by the multiplexer 715. The round-robin selection of the buffer can comprise a weighted round-robin selection that is weighted to select the second buffer 718 more frequently than the first buffer 717 and/or the third buffer 716. Example operation 810 comprises sending, by the processor 700, uplink data 759 from the buffer (i.e., the buffer selected via operation 808) to an upstream device via a north interface 712 of the processor 700.

Figure 9:
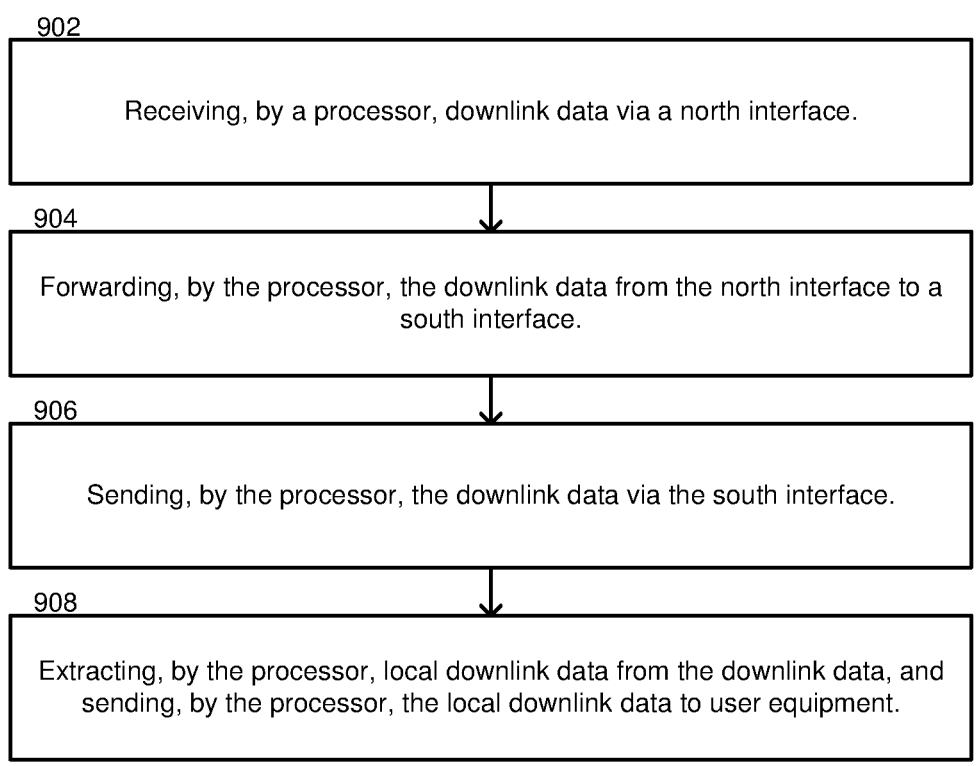
FIG. 9 is a flow diagram representing another set of example operations of an RU processor in connection with processing downlink data, in accordance with various aspects and embodiments of the subject disclosure.

FIG. 9 is a flow diagram representing another set of example operations of an RU processor in connection with processing downlink data, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 9 can be performed, for example, by an RU processor 700 such as illustrated in FIG. 7, and the operations of FIG. 9 can be performed simultaneously or intermittently along with the operations illustrated in FIG. 8. Example operation 902 comprises receiving, by a processor 700, downlink data 755 via a north interface 712. Example operation 904 comprises forwarding, by the processor 700, the downlink data 755 from the north interface 712 to a south interface 713. Downlink data 756 represents either all of downlink data 755 or a subset thereof. Example operation 906 comprises sending, by the processor 700, the downlink data 756 via the south interface 713. Example operation 908 comprises extracting, by the processor 700, local downlink data 757 from the downlink data 755, and sending, by the processor 700, the local downlink data 757 to user equipment.

Figure 10:
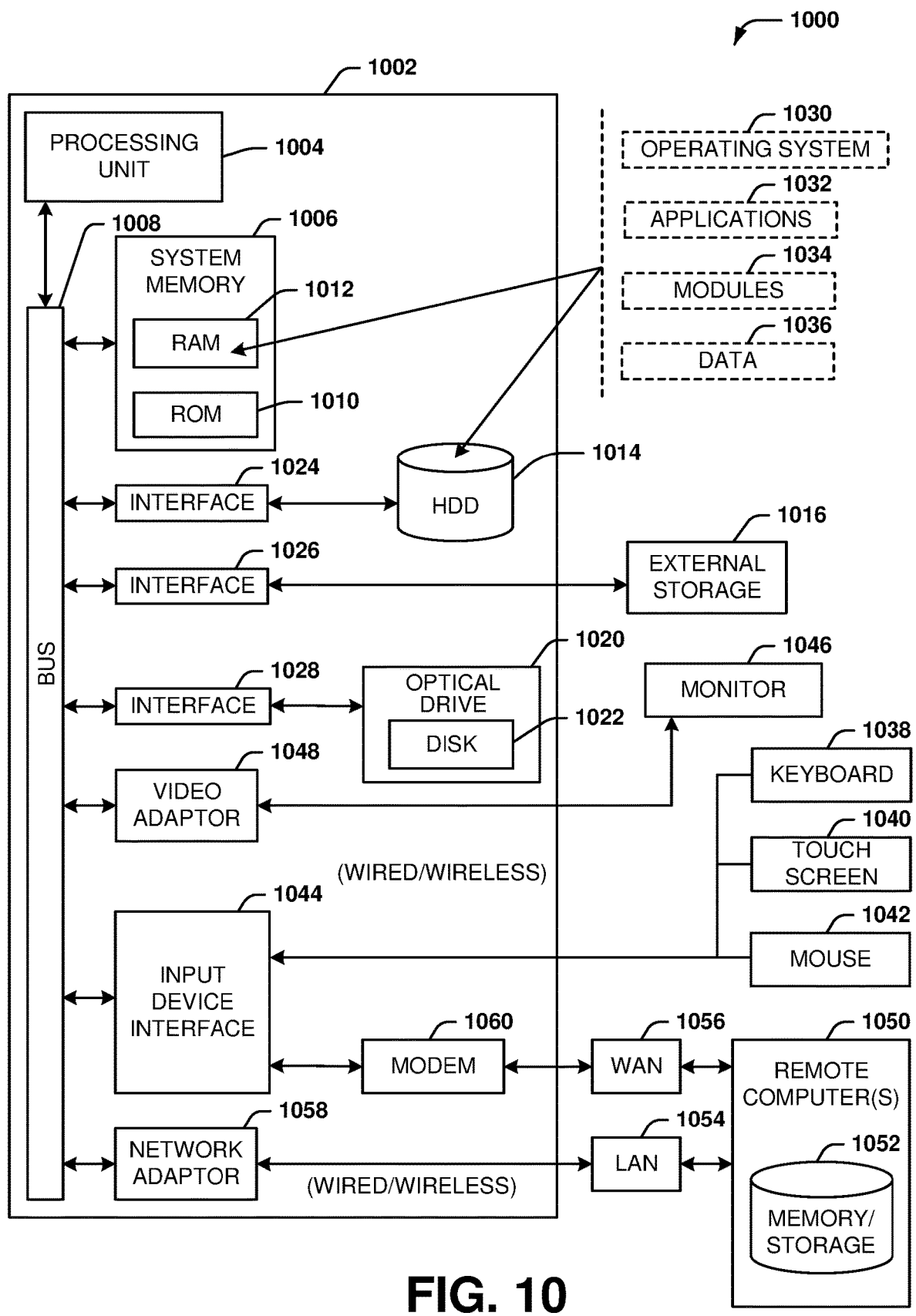
FIG. 10 is a block diagram of an example computer that can be operable to execute processes and methods in accordance with various aspects and embodiments of the subject disclosure.

FIG. 10 is a block diagram of an example computer that can be operable to execute processes and methods in accordance with various aspects and embodiments of the subject disclosure. The example computer can be adapted to implement, for example, any of the various network equipment described herein.

FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), smart card, flash memory (e.g., card, stick, key drive) or other memory technology, compact disk (CD), compact disk read only memory (CD-ROM), digital versatile disk (DVD), Blu-Ray™ disc (BD) or other optical disk storage, floppy disk storage, hard disk storage, magnetic cassettes, magnetic strip(s), magnetic tape, magnetic disk storage or other magnetic storage devices, solid state drives or other solid state storage devices, a virtual device that emulates a storage device (e.g., any storage device listed herein), or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A processor for a radio unit of a radio access network, the processor comprising:
   a group of buffers comprising:
      a first buffer that receives first uplink data from a local radio interface, wherein the local radio interface receives the first uplink data from a user equipment that is wirelessly coupled to the radio unit, and wherein the radio unit is a member of a group of radio units coupled to a distributed unit in a daisy chain via a common fronthaul link; and
      a second buffer that receives second uplink data from a south interface, wherein the south interface receives the second uplink data from a downstream radio unit of the group of radio units that is downstream from the radio unit in an uplink data path of the daisy chain; and
   a multiplexer that iteratively:
      selects a buffer from the group of buffers that minimizes latency for all radio units in the group of radio units for the uplink data path, and
      sends uplink data from the buffer via a north interface, wherein the north interface sends the uplink data to an upstream device that is upstream from the radio unit in the uplink data path of the daisy chain, wherein the upstream device is the distributed unit or an upstream radio unit of the group of radio units that is upstream from the radio unit in the uplink data path of the daisy chain.

2. The processor of claim 1, wherein the multiplexer performs round-robin selection of the buffer.

3. The processor of claim 2, wherein the round-robin selection of the buffer comprises a weighted round-robin selection to select the second buffer more frequently than the first buffer.

4. The processor of claim 3, wherein the weighted round-robin selection comprises an interleaved weighted round-robin selection.

5. The processor of claim 1, wherein the group of buffers further comprises a third buffer that receives third uplink data comprising local synchronization plane data.

6. The processor of claim 1, wherein the first uplink data and the second uplink data comprise data packets, wherein the multiplexer uses a cut-through approach to send the uplink data from the buffer, and wherein the cut-through approach enables the multiplexer to begin sending a data packet upon arrival of a portion of the data packet to the buffer.

7. The processor of claim 1, wherein the north interface is further adapted to receive downlink data from the upstream device, wherein the south interface is further adapted to send the downlink data to the downstream radio unit, and wherein the processor is further adapted to forward the downlink data from the north interface to the south interface.

8. The processor of claim 7, wherein the processor further comprises a packet classifier to extract local downlink data from the downlink data, and wherein the local radio interface sends the local downlink data to the user equipment.

9. The processor of claim 1, wherein the north interface applies a timestamp to the uplink data, and wherein the timestamp is adjusted to account for delay of the uplink data as the uplink data passes through the radio unit.

10. A method, comprising:
    storing, by a processor at a radio unit, first uplink data in a first buffer of a group of buffers, wherein the first uplink data is received from a user equipment that is wirelessly coupled with the radio unit via a local radio interface of the processor, and wherein the radio unit is a member of a group of radio units coupled to a distributed unit in a daisy chain via a common fronthaul link;
    storing, by the processor, second uplink data in a second buffer of the group of buffers, wherein the second uplink data is received from a downstream radio unit of the group of radio units via a south interface of the processor, wherein the downstream radio unit is downstream from the radio unit in an uplink data path of the daisy chain; and
    iteratively:
        selecting, by the processor, a buffer from the group of buffers that minimizes latency for all radio units in the group of radio units for the uplink data path; and
        sending, by the processor, uplink data from the buffer to an upstream device via a north interface of the processor, wherein the upstream device is upstream from the radio unit in the uplink data path of the daisy chain, wherein the upstream device is the distributed unit or an upstream radio unit of the group of radio units that is upstream from the radio unit in the uplink data path of the daisy chain.

11. The method of claim 10, wherein selecting the buffer comprises round-robin selection of the buffer.

12. The method of claim 11, wherein the round-robin selection of the buffer comprises a weighted round-robin selection that is weighted to select the second buffer more frequently than the first buffer.

13. The method of claim 10, further comprising storing, by the processor, third uplink data in a third buffer of the group of buffers, wherein third uplink data comprises at least one of local synchronization plane data, local management plane data, or local operations, administration, and maintenance traffic.

14. The method of claim 10, further comprising:
    receiving, by the processor, downlink data from the upstream device via the north interface;
    forwarding, by the processor, the downlink data from the north interface to the south interface; and
    sending, by the processor, the downlink data to the downstream radio unit via the south interface.

15. The method of claim 14, further comprising extracting, by the processor, local downlink data from the downlink data, and sending, by the processor, the local downlink data to the user equipment.

16. A radio unit for a radio access network, comprising:
    a group of buffers comprising a first buffer and a second buffer;
    a local radio interface coupled with the first buffer, wherein the radio unit is configured to receive, via the local radio interface, first uplink data from a user equipment that is wirelessly coupled with the radio unit, wherein the radio unit is configured to store the first uplink data in the first buffer, and wherein the radio unit is a member of a group of radio units coupled to a distributed unit in a daisy chain via a common fronthaul link;

a south interface coupled with the second buffer, wherein the radio unit is configured to receive, via the south interface, second uplink data from a downstream radio unit of the group of radio units that is downstream from the radio unit in an uplink data path of the daisy chain, wherein the radio unit is configured to store the second uplink data in the second buffer;

a multiplexer coupled with the group of buffers, wherein the multiplexer is configured to iteratively:

select a buffer from the group of buffers that minimizes latency for all radio units in the group of radio units for the uplink data path, and forward uplink data from the buffer to a north interface coupled with the multiplexer, wherein the radio unit is configured to send, via the north interface, the multiplexed output to an upstream device that is upstream from the radio unit in the uplink data path of the daisy chain, wherein the upstream device is the distributed unit or an upstream radio unit of the group of radio units that is upstream from the radio unit in the uplink data path of the daisy chain.

17. The radio unit of claim 16, further comprising a clock, and wherein the radio unit is configured to use the clock to apply timestamps to the uplink data.

18. The radio unit of claim 16, wherein the radio unit is configured to receive downlink data from the upstream device via the north interface, and forward the downlink data to the downstream radio unit via the south interface.

19. The radio unit of claim 16, wherein the multiplexer is configured to use round-robin selection of the buffer.

* * * * *